United States Patent Office 3,090,546
Patented May 21, 1963

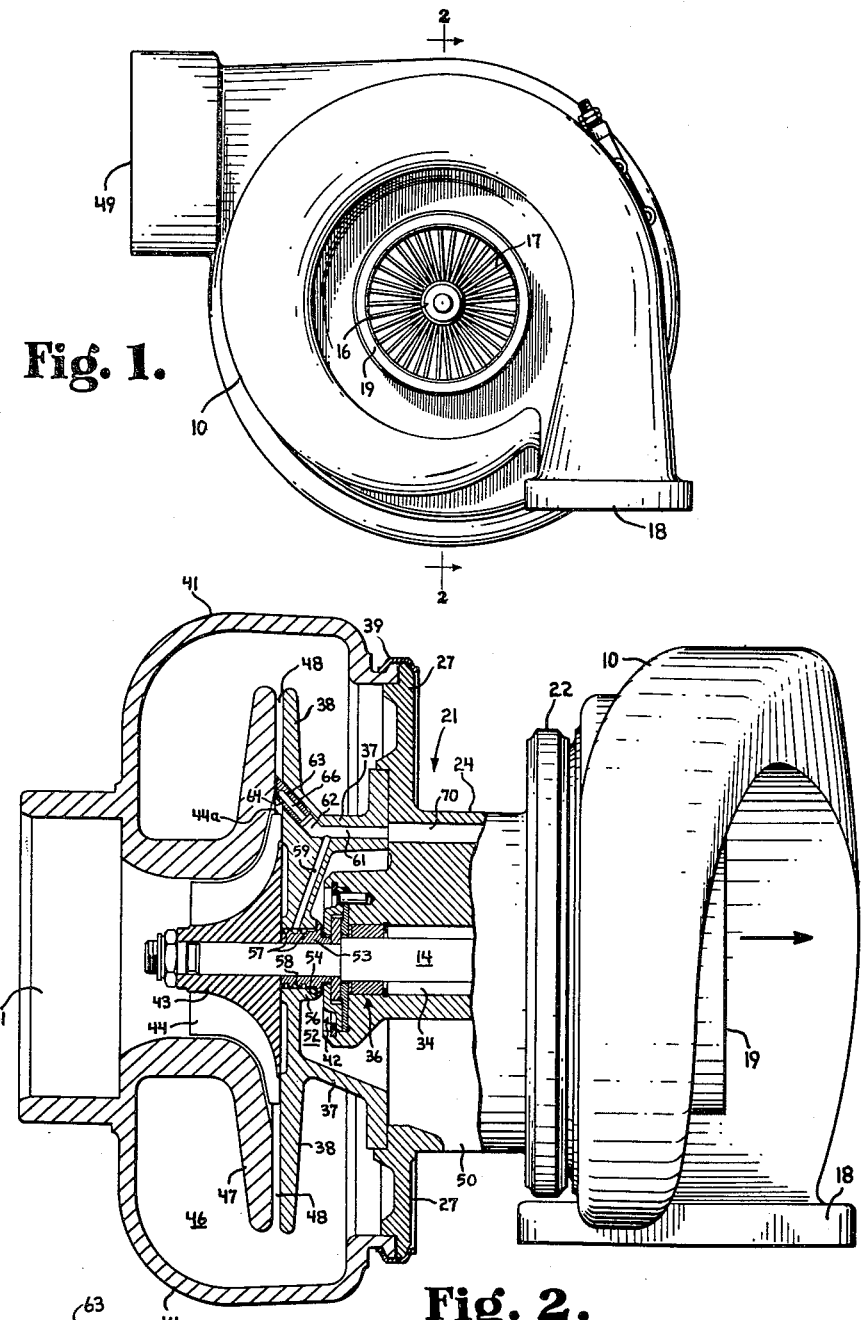

3,090,546
PRESSURIZED OIL SEAL FOR ROTATING MACHINERY
William E. Woollenweber, Jr., Columbus, Ind., assignor to Schwitzer Corporation, Indianapolis, Ind., a corporation of Indiana
Filed Dec. 29, 1960, Ser. No. 79,244
1 Claim. (Cl. 230—132)

This invention relates generally to the sealing of bearing structures against the migration of lubricating or cooling oil or other fluids away from the bearing area. The invention is particularly concerned with the prevention of flow of lubricating and cooling oil into the compressor wheel area of a high speed supercharger compressor.

In conventional rotating machinery such as gas turbine driven superchargers, it is customary to provide sleeve or ball bearings lubricated by oil under pressure as a means of sustaining rotation of the main shaft. This lubricating oil must be confined within the bearing area and then carried away to an oil sump. In the case of turbochargers, since entry of lubricating oil into the engine cylinders is highly undesirable, the lubricating oil must be prevented from entering the compressor or turbine housings. In low speed rotating machinery positive contact type oil seals are in general use. However, in high speed applications, as in the case of a turbocharger, the positive contact seals are unsatisfactory because of high friction losses and rapid wear of the contact surfaces.

In the field of application which includes turbochargers, it is old in the art to utilize compressor outlet pressure introduced into the seal area to prevent leakage of oil past the seal. This arrangement functions satisfactorily under normal conditions of operation wherein a positive pressure always exists at the compressor outlet or in the compressor collector area. However, conditions existing in a diesel engine supercharged by a turbocharger are such that under certain operating conditions of the supercharged engine, the engine aspirates more air flow than can be supplied by the supercharger compressor. Thus, a vacuum condition may at times exist in the compressor housing which can reach magnitudes of 3 to 5 inches of mercury and which makes the problem of designing a non-contact type of oil seal extremely difficult.

Since the pressure existing in the oil drain area is normally atmospheric, or slightly positive, the presence of a subatmospheric pressure in the compressor housing actually induces oil leakage into the compressor housing. This adverse condition is accentuated by the use of filters in the compressor air intake passage. These impose an increased amount of pressure drop on the supercharger intake causing the vacuum exerted on the oil seal to increase as the clogging of the air filter increases under normal operation. For example, a new air intake filter on a typical turbocharged diesel engine installation might have a pressure drop such that even when the engine aspirates air in a larger quantity than can be supplied by the turbocharger compressor, the pressure existing in the compressor housing remains very close to atmospheric. However, as the air filter clogs in normal usage, the pressure drop across the filter increases to thereby increase the vacuum existing in the compressor housing under the given air aspirating engine condition. A completely satisfactory oil seal is required to block the entry of oil into the compressor housing even under these aggravated conditions.

It is the primary object of the present invention to provide a pressurized oil seal which will function properly at high speeds of rotation and under conditions of relatively high vacuum as well as relatively high pressure existing in areas adjacent the seal.

It is a further object of the present invention to provide a seal for a compressor wheel shaft by introducing a pressure into a bearing cavity, the pressure introduced having a component of its total magnitude resulting from the conversion of the kinetic energy of air leaving the compressor wheel into static pressure.

A further object of the present invention is to provide a compressor wheel shaft bearing seal comprising spaced piston rings disposed upon a shaft with air introduced into the space between the rings at a static pressure which is a direct function of the velocity of air leaving the compressor wheel.

A further object of the present invention is to provide a seal of the type referred to in which the pressure introduced into the seal may be readily varied or adjusted.

The full nature of the present invention will be understood from the accompanying drawings and the following description and the claims.

FIG. 1 is an end view of a structure embodying the present invention.

FIG. 2 is a side sectional view taken generally along the line 2—2 of FIG. 1, showing only the pertinent compressor end of the structure.

FIG. 3 is a fragmentary, end-on view of a component of the structure embodying the present invention.

Referring to the drawings, there is shown a gas turbine driven supercharger which is composed of a turbine housing 10 enclosing a conventional bladed turbine wheel 16 adapted to drive the shaft 14. The turbine housing is provided with a flanged inlet passage 18 which transmits engine exhaust gases to the turbine wheel. The turbine itself is of conventional construction and, it will be understood, high pressure gases entering the turbine are expanded through the turbine wheel, causing rotation thereof, the spent gases being discharged through the turbine outlet passage 19.

Attached to the turbine housing casting 10 is an intermediate casting 21, the two castings being held in sealed relation by means of clamp ring 22. The casting 21 is nonsymmetrical in configuration and includes a central portion 24 and outwardly flanged area 27 at one end of the central portion. The central portion 24 of the casting 21 is provided with an aperture 34 through which the shaft 14 extends. Within this aperture the portion 24 carries conventional rotary and thrust bearings indicated generally at 36 which permit free rotation of the shaft.

Bolted to the flanged portion 27 of the casting 21 is a compressor back plate casting 37 having an outwardly flanged section 38. Also attached to the portion 27 of the casting 21 by means of the clamp ring 39 is a compressor cover casting 41. The shaft 14 and the central portion 24 of the casting 21 carry cooperating components of a conventional thrust bearing indicated generally at 42. The extending portion of the shaft 14 is of reduced diameter and has mounted thereon a centrifugal type compressor rotor or wheel 43 carrying a plurality of blades 44. The compressor casting 41 is formed to provide a generally annular collector area 46 which accommodates high pressure gases delivered from the compressor. The casting 41 is further formed with an internal annular flange 47 which cooperates with the flange 38 of the casting 37 to provide an annular diffuser passage 48. The collector area 46 communicates with a tangentially extending outlet or discharge passage 49 (FIG. 1), the passage 49 being connected by appropriate tubing to the intake manifold of the internal combustion engine served by the turbocharger.

The compressor housing casting 41 is flanged to provide an inlet passage 51 which communicates with atmosphere or with the air induction system of the engine served by the turbocharger. It will be understood that with the engine upon which the turbocharger is installed in operation, the exhaust gases will rotate the turbine wheel 16 to drive the compressor wheel 43. Rotation of the compressor wheel will charge the engine with compressed air, thereby forcing into the engine cylinders an amount of charge air greater than could be drawn into it by the pumping action of the engine pistons. This charging action combined with increased fuel supply to the engine cylinders produces the increased power which is characteristic of supercharged engines.

There has been so far described a generally conventional turbocharger and its operation has been referred to without reference to the seal of the present invention between the compressor housing and the area 52 adjacent the thrust bearing 42. The bearings are supplied with lubricating and cooling oil under pressure by means of passages in the casting 21 which are not shown. This oil circulates about the bearing area and exits through an aperture 50 to a suitable sump not shown. The seal of the present invention prevents this oil from migrating to the compressor housing and to the compressor wheel along the shaft 14.

The structure embodying the present invention includes a sleeve 53 rigidly mounted on the reduced portion of the shaft 14. The sleeve 53 is provided with a slinger flange 54 which aids in repelling oil from entering the space between the outer surface of the sleeve 53 and the tubular portion 56 of the compressor back plate casting 37. The sleeve is provided with two spaced piston rings 57 and with an annular cavity 58 located between the piston rings. Adjacent the upper margin (as viewed in FIG. 2) of the sleeve the casting 37 is provided with an inclined passage 59 which communicates with a horizontal passage 61. The inner end of the passage 61 communicates with an inclined passage 62 which extends through the flange portion 38 and terminates at the diffuser passage 48. A pressure pick up device in the form of a spud or fitting 63 is accommodated in the passage or bore 62. The fitting extends into the diffuser passage sufficiently to present to the tips 44a of the compressor blades an intake passage 64. The passage 64 communicates with an axial bore or passage 66 through the fitting, the passage 66 communicating with the passage 62. As shown in FIG. 2, the rightward extension of the passage 61 communicates with a passage 70 in the portion 24 of the casting 21. By means of a fitting (not shown) the passage 70 may be connected to a source of air under pressure for blowing out the passages just described when such service is necessary. It will be understood that the rightward extension of the passage 61 and the passage 70 has no function in the operation of the seal of the present invention.

In operation, with the compressor wheel driven by the turbine, air will move at high velocity outwardly through the diffuser passage under the action of the compressor wheel. This high velocity air is picked up by the fitting 63 and, via the passages 66, 62 and 59, the kinetic energy of this air is transformed into static pressure at the annular cavity 58 and throughout the space between the piston rings 57. This positive pressure prevents oil from moving along the sleeve 53 into the compressor housing. The space between the piston rings 57 is thus maintained at a positive pressure even though the pressure in the collector area and the compressor outlet might drop to a value below atmospheric. It should be pointed out that the engine operating conditions (that is, aspiration of more air by the engine than can be supplied by the compressor) which create a subatmospheric pressure in the compressor housing are coincidental with, or always accompanied by, high air velocity through the diffuser passage 48. Conversion of this high velocity into a static pressure between the rings 57 is thus assured at precisely the time when it is needed, that is, when the pressure existing in the compressor housing falls to or below atmospheric. As disclosed herein, the pressure pick-up fitting 63 is located closely adjacent the tips of the compressor wheel blades. It will be understood that this fitting might be located further outwardly in the diffuser passage without altering the over-all functioning of the seal.

It should further be noted that the pressure introduced into the space between the piston rings may be varied over the operating range of the compressor by changing the angle of attack of the passage 64 with relation to the direction of air flow through the diffuser passage. In FIG. 3 the direction of air flow, for a given intermediate compressor wheel speed, is indicated by the arrowed line 71 and the angle of attack of passage 64 therewith is indicated at 72. The entrance passage 64 in the pick-up 63 may be positioned so as to directly face the movement of the air leaving the compressor wheel to provide maximum total pressure pick up. The fitting 63 may also be altered in position so that the axis of aperture 64 is at an angle, for example angle 72 of FIG. 3, with the resultant direction of movement of air leaving the compressor wheel thus reducing the total amount of pressure pick up. It will be evident that the magnitude of pressure pick up will be inversely proportional to the size of the angle of attack 72 of FIG. 3 and that the position of fitting 63 can be adjusted to vary this angle. This adjustability feature can be utilized in conjunction with the normal operating characteristics of a compressor wheel. At low flow rates and low rotating speeds, the angle of the air leaving the compressor wheel is appreciably different than the angle of exit when the compressor is operating at high speeds for high flow rates. Under the former condition the direction of air movement indicated by arrowed line 71 in FIG. 3 approaches the vertical, and under the latter condition it approaches the horizontal. Since it is desirable to provide maximum total pressure pick up at low speeds and high flow rates but to reduce the amount of total pressure pick up at high rotating speeds so as not to over-pressurize the seal, the pick up fitting can be positioned so as to achieve the optimum over-all pressure variation.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

What is claimed is:

In a centrifugal type compressor, a bladed compressor wheel, a housing encompassing said wheel, said wheel being mounted for rotation within said housing by means of a driven shaft extending exteriorly of said housing, a hub area formed in said housing accommodating said shaft, said housing having annular spaced interior flanges extending radially away from the axis of said compressor wheel and shaft to provide an annular diffuser passage outboard of the compressor wheel blade edges, pressurized oil sealing means for preventing the migration of oil from the exterior to the interior of said housing through said hub area, said oil sealing means comprising a bearing sleeve carried by said shaft and extending within said hub area, said sleeve having an annular groove on its outer surface, spaced sealing rings carried by said sleeve on opposite sides of said groove whereby the space between said rings including the cavity defined by said groove cooperate with the adjacent hub area housing surface to define a pressure chamber, and means for providing a positive pressure in said chamber independently of the static pressure in said housing comprising a pressure pick-up fitting having a passage therethrough, said passage having an intake end and an outlet end with its outlet end communicating with said chamber, said fitting being mounted within said housing so as to extend into said diffuser passage with the intake end of said passage facing the direction of air movement from the compressor wheel blades whereby the static pressure in said chamber has a component of its total magnitude resulting from the conversion into static pressure of the kinetic energy of air leaving the compressor wheel blades, and means for adjustably positioning said fitting to vary the angle of attack of said passage intake end with relation to the direction of air movement through said diffuser passage.

References Cited in the file of this patent

UNITED STATES PATENTS

| | | |
|---|---|---|
| 1,413,425 | Rice | Apr. 18, 1922 |
| 1,966,855 | Gregg | July 17, 1934 |
| 2,124,914 | Fottinger | July 26, 1938 |
| 2,264,341 | Sinclair et al. | Dec. 2, 1941 |
| 2,326,824 | Browne et al. | Aug. 17, 1943 |
| 2,656,096 | Schwarz | Oct. 20, 1953 |
| 2,768,584 | Nichol et al. | Oct. 30, 1954 |
| 2,921,533 | Williams | Jan. 19, 1960 |
| 3,024,734 | Dickson et al. | Mar. 13, 1962 |